Patented Dec. 1, 1953

2,661,374

UNITED STATES PATENT OFFICE 2,661,374

SYNTHESIS OF 4-HYDROXY-2-CYCLO-PENTEN-1-ONES

Milton S. Schechter, Washington, D. C., and Frederick B. La Forge, North Arlington, Va., dedicated to the free use of the People of the United States No Drawing. Application February 8, 1949,
Serial No. 75,282

19 Claims. (Cl. 260—586)

(Granted under Title 35, U. S. Code (1952), sec. 266)

This application is made under the act of March 3, 1883. As amended by the act of April 30, 1928, and the invention herein described, if patented in any country, may be manufactured and used by or for the Government of the United States of America for governmental purposes throughout the world without the payment to us of any royalty thereon.

We hereby dedicate the invention herein described to the free use of the people in the territory of the United States to take effect on the granting of a patent to us.

Since the publication of the results of the investigations of Staudinger and Ruzicka on the active principles of pyrethrum flowers [Helv. Chim. Acta, 7, 177–259, 377–458 (1924)], considerable work was done to revise and correct the structures which they proposed. The present invention relates to the synthesis of esters closely related to the pyrethrins and having their characteristic insecticidal properties. This invention also relates to the synthesis of cyclopentenolones and to hydroxydiketones which can be cyclized to cyclopentenolones. Certain esters of some of these new cyclopentenolones are comparable or superior to the pyrethrins and cinerins in insecticidal activity.

The hydroxydiketones prepared according to this invention are of Formula I, shown below. The cyclopentenolones of Formula II are produced by the cyclization of the hydroxydiketones.

R may be a hydrocarbon radical or substituted hydrocarbon radical such as alkyl, for example, methyl, ethyl, propyl, iso-propyl, n-butyl, secondary butyl, tertiary butyl, n-amyl, secondary and tertiary amyl, n-hexyl and isomers, heptyl, octyl, nonyl, dodecyl, octadecyl, and substituted alkyl, alkenyl such as allyl, 2-methylallyl, vinyl, and 2- or 3-butenyl, substituted alkenyl such as 2- or 3-chlorallyl, alkynyl such as 2-propynyl, alkadienyl, such as 2, 4-pentadienyl, alkatrienyl, aryl such as phenyl and napthyl, alkylaryl such as xylyl, aralkyl such as benzyl and phenylethyl, aralkenyl such as cinnamyl, cycloalkyl such as cyclopropyl, cyclohexyl and cyclopentyl, and cycloalkenyl such as cyclopentadienyl or cyclohexenyl. R may also be a heterocyclic radical such as furfuryl or thenyl.

R' may be alkyl such as methyl, ethyl, propyl, iso-propyl, butyl, secondary and tertiary butyl, pentyl and isomers, octyl, decyl, and heptadecyl, substituted alkyl, alkenyl or substituted alkenyl, aryl such as phenyl, methyl phenyl, xylyl, substituted aryl, aralkyl such as benzyl and phenylethyl, aralkenyl such as styryl, and cycloalkyl such as cyclohexyl and cyclopentyl.

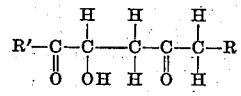

Formula I

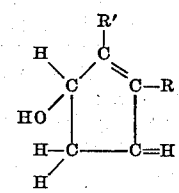

Formula II

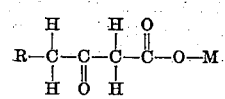

Formula III

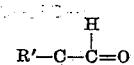

Formula IV

There is a great variety of radicals which anyone skilled in the art may utilize as R and R'. Thus, R can originate from any compound of the type R—CH$_2$—CO—CH$_2$—COO—M, Formula III, (where M is an alkali metal such as sodium or potassium). R' can originate from any compound of the type R'—CO—CHO, Formula IV.

The reactants for preparing the hydroxydiketones are the alkali salts of beta-keto acids of the type R—CH$_2$—CO—CH$_2$—COO—M (Formula III) and the substituted glyoxals of the type R'—CO—CHO (Formula IV). The substituted glyoxals may be prepared by many different methods known to those skilled in the art, one such convenient method being the oxidation of methyl ketones, R'—CO—CH₃, or aldehydes having an alpha methylene group,

R'—CH₂—CHO by selenium dioxide. Thus, acetone may be oxidized to pyruvaldehyde, CH₃—CO—CHO, and acetophenone to phenylglyoxal, C₆H₅—CO—CHO. The alkali salts of beta-keto acids may be prepared by saponification of the corresponding beta-keto esters at room temperature or lower by means of aqueous solutions of alkali hydroxides. Any excess alkali left at the end of the saponification may be neutralized with acid or by bubbling carbon dioxide into the solution. Certain beta-keto acids which are sufficiently stable, such as beta-oxocaprylic acid, may be isolated as such, stored at low temperature, and neutralized with cold aqueous alkali when ready to be used.

The synthesis of compounds of the type shown in Formula I consists in reacting, in substantially equi-molecular quantities, at room temperature or below, a substituted glyoxal of the type shown in Formula IV with a beta-keto acid of the type shown in Formula III (M=hydrogen) or with one of its alkali salts (Formula III; M=sodium or potassium), the pH of the solution preferably being kept between about pH 5 to about pH 9. It is inadvisable to have the solution too alkaline or too acidic. If it is too alkaline some of the substituted glyoxal may rearrange to a hydroxy acid, whereas if it is too acidic, some of the beta-keto acid may decompose; in either case, the yields of desired product will be lowered. To maintain the pH within desired limits, the reaction may be carried out in the presence of buffers, or else acid or alkali may be added as the reaction proceeds. The substituted glyoxal may be used pure or in solution. If the substituted glyoxal is only moderately soluble in water, such as phenylglyoxal, the reaction mixture may be agitated or a cosolvent such as alcohol may be added. Provided that the solution is not made too acidic nor too alkaline at first, the pH will tend to adjust itself to a suitable value because of the production of alkali bicarbonate, the reaction probably taking place by the mechanism shown in Equation 1, where M is an alkali metal such as Na or K.

Equation 1.

R'—CO—CHO + R—CH₂—CO—CH₂—COO—M ⟶

[R'—CO—CHOH—CH—CO—CH₂—R], (Intermediate condensation product)

↓ + H₂O

R'—CO—CHOH—CH₂—CO—CH₂—R + MHCO₃

That the intermediate condensation product (not isolated) of Equation 1 decarboxylates spontaneously is evident for several reasons. Firstly, in those cases where R is large enough to render the hydroxydiketone difficultly soluble in water (for example where R is butyl), the hydroxydiketone separates out of the reaction mixture as an oil during the progress of the reaction.

Secondly, when the reaction is run under alkaline conditions, the hydroxydiketone may be extracted directly from the reaction mixture which is still faintly alkaline at the end of the reaction. Thirdly, when the reaction is run under alkaline conditions, after having extracted the hydroxydiketone, a titration of the remaining extracted liquid for alkali bicarbonate indicates that practically the theoretical amount is produced.

If, by means of buffers or by the addition of acid, the reaction is run under acidic conditions, the formation of the intermediate condensation product takes place as shown in Equation 1, where M is now hydrogen rather than an alkali metal, and the carbon dioxide resulting from the decarboxylation of the intermediate condensation product is liberated as a gas instead of appearing as alkali bicarbonate.

The mechanisms proposed above are not to be considered as limiting the invention in any way since the reactions may actually take place in a different manner.

The reactions are usually substantially complete in about six hours at room temperature but may be allowed to proceed for a longer period. The hydroxydiketones may be separated from the reaction mixtures, dried, and distilled in vacuo, or they may be extracted with a solvent such as ether. The ether solution is then washed, dried, and the ether evaporated, the residue being subjected to distillation in high vacuum. The yields usually are from about 50% to 75% of the theory. Whereas we prefer aqueous or aqueous-alcoholic solutions, it is within the scope of this invention to carry out the preparation of the hydroxydikestones in organic solvents. Specific examples of the preparation of hydroxydikestones of the type illustrated in Formula I will be described in the experimental section.

The cyclopentenolones are prepared by the cyclization of the hydroxydikestones in a suitable alkaline medium. When the hydroxydikestones are treated with aqueous or aqueous-alcoholic solutions of alkaline cyclizing agents such as sodium hydroxide, potassium hydroxide, barium hydroxide, piperidine or quaternary ammonium hydroxides, water is eliminated intramolecularly and the hydroxydikestones are converted to cyclopentenolones as shown in Equation 2. The employment of 10 to 20 volumes of a 1 to 10% aqueous sodium hydroxide solution has proved to be quite satisfactory. Although it is preferable to use the distilled hydroxydiketones, it is possible to employ the crude, undistilled products. Whereas we prefer aqueous or aqueous-alcoholic solutions, it is within the scope of this invention to carry out the cyclizations in organic solvents.

Equation 2.

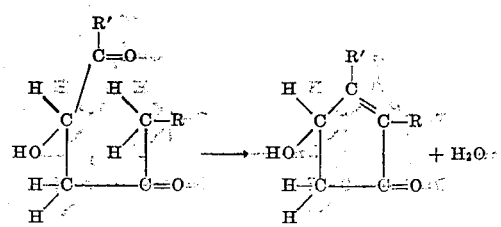

The beta-keto esters listed in Table I below were prepared employing the general procedures described by Soloway and La Forge, J. Am. Chem. Soc. 69, 2677 (1947); Green and La Forge, J. Am.

Chem. Soc. 70, 2287 (1948), and Wallingford, Homeyer and Jones, J. Am. Chem. Soc., 63, 2252 (1941), except for methyl 3-oxo-7-octenoate, which was prepared by the method of Harper, J. Chem. Soc., 892 (1946).

Several beta-keto acids were prepared by saponification of the corresponding esters with a slight excess of a 5 to 10% aqueous potassium hydroxide solution at about 5° for three days. Upon acidification to Congo red with dilute sulfuric or hydrochloric acid, the free keto acids were obtained. Beta-oxocaprylic acid, M. P. 75–76° (dec.) [c. f. Locquin, Bull. Soc. Chim. 31 (3), 597 (1904)], and 3-oxo-6-octenoic acid, M. P. 71–72° (dec.), were thus prepared. These acids are stable for months in the refrigerator but slowly decompose at room temperature with the liberation of carbon dioxide. 3-oxo-6-heptenoic acid was prepared in the same manner but was isolated as an oil which crystallizes on cooling with Dry Ice and melts on warming to room temperature with slow decomposition.

Pyruvaldehyde was prepared from acetone and selenium dioxide by the general procedure of Riley and co-workers [J. Chem. Soc. 1875 (1932); 621 (1938)]. Phenylglyoxal hydrate was prepared according to "Organic Synthesis," Collective vol. II, p. 509 (1943), John Wiley and Sons, Inc., New York, N. Y. The pyruvaldehyde was assayed by the methods of Friedemann, J. Biol. Chem. 73, 331 (1927) and Simon and Neuberg, Biochem. Zeit., 232, 479 (1931).

The procedures used by us in the preparation of the hydroxydiketones of Formula I are as follows:

*Procedure A.*—The beta-keto acid was isolated as described above, mixed with ice-cold water and exactly neutralized with cold 10% sodium hydroxide solution. The pyruvaldehyde, usually dissolved in a little water, was added and the alkalinity adjusted to approximately pH 8. It is immaterial if the pyruvaldehyde has polymerized during storage in the refrigerator since it either dissociates on standing in dilute aqueous solution or else a shift of equilibrium to the monomer occurs as it reacts. When phenylglyoxal hydrate, which is not very soluble in water, was employed, the reaction mixture was shaken or stirred.

If the reaction medium is too alkaline, some of the substituted glyoxal may be converted to a hydroxy acid before it can react with the salt of the beta-keto acid. In those cases where the hydroxydiketones are insoluble, the reaction mixture turns cloudy in about two hours and the oily reaction product separates practically completely during several more hours. The lower molecular weight hydroxydiketones may separate partially or not at all depending on their solubility and the volume of the reaction mixture. In these cases, the solutions were saturated with sodium chloride before extraction.

After a period of about sixteen hours to several days, the reaction mixture was extracted with peroxide-free ether. The ether solution was washed with saturated salt solution and after drying over sodium sulfate, the solvent was removed and the residue distilled in high vacuum. There was little or no forerun, but there was usually a fraction, not further investigated, having a considerably higher boiling point than the desired compound.

*Procedure B.*—This is the same as procedure A except that the beta-keto ester was saponified with a slight excess of a 5 to 20% potassium hydroxide solution for several days in the refrigerator. The excess alkali was neutralized with dilute sulfuric acid, the substituted glyoxal added, and the alkalinity adjusted to approximately pH 8.

*Procedure C.*—This is the same as procedure B except that instead of neutralizing the alkaline solution of the beta-keto acid with dilute sulfuric acid, the solution was saturated with carbon dioxide using a porous disperser. The excess alkali is thereby converted to bicarbonate giving a suitable pH and the substituted glyoxal may be added without further adjustment of the alkalinity.

A number of hydroxydiketones of the type illustrated in Formula I, were prepared by these general procedures. Table II sets forth a number of hydroxydiketones prepared by one of procedures A, B, or C, and the reaction conditions, and physical constants of the hydroxydiketones. Table III presents the analytical data on the hydroxydiketones and their semicarbazone derivatives (prepared in pyridine-ethanol solution). The analyses of the semicarbazone derivatives indicated that water had been eliminated so that they are either anhydrodisemicarbazones or pyrazoline derivatives. The anhydrodisemicarbazones can be obtained in low- and high-melting forms depending on the solvent used for recrystallization.

Typical experiments describing the preparation of hydroxydiketones and some variations which may be employed follow:

*3-hydroxy-2,5-decanedione (Table II, compound A).*—Procedure A was used. Thirty grams of beta-oxocaprylic acid (0.19 mole) mixed with 50 ml. of cold water in a glass stoppered flask was kept cold in an ice bath and titrated with 10% sodium hydroxide solution until just alkaline to phenolphthalein. The stoppered flask was shaken vigorously near the end of the titration. Eighteen grams of pyruvaldehyde (87.6% assay) (0.22 mole) was added and rinsed in with a little water. The alkalinity of the reaction mixture was adjusted to approximately pH 8 using a pH test paper, by the careful addition of a little 10% sodium hydroxide solution. The total volume of the reaction mixture was 200 ml. In about two hours at room temperature, the solution turned milky and the oily reaction product which was forming rose to the surface. After two days, the reaction mixture was still faintly alkaline. It was extracted several times with ether, the extracts were combined and washed several times with saturated sodium chloride solution and after drying the extract over anhydrous sodium sulfate, the ether was distilled off leaving a residue of 32 g. of yellow oil which was distilled in vacuo. After a small forerun, the main fraction was collected at 89–95° (0.05 mm.), most of it distilling at 93–95°, $n_D^{25}$ 1.4514; yield 23 g. (65%). There was also a higher boiling fraction, B. P. 150–155° at 0.15 mm., which was not investigated.

An aliquot of the reaction mixture, after it had been extracted by ether, was titrated for sodium bicarbonate using 1 N sulfuric acid solution and methyl orange indicator, the solution being boiled near the end of the titration. The theoretical amount of sodium bicarbonate was found.

A similar experiment was performed starting with beta-oxocaprylic acid and pure pyruvaldehyde-sodium bisulfite compound (instead of pyruvaldehyde) with final adjustment of the alkalinity to approximately pH 8. After standing for two days, very little oil separated. The reaction mixture was acidified to Congo red with dilute sulfuric acid (1:4) and heated for 15 min. on the steam bath under a reflux condenser in order to decompose any bisulfite addition compounds. The product was isolated as usual by extraction with ether and distillation in vacuo, giving only a 19% yield of 3-hydroxy-2,5-decanedione.

Another experiment was run using commercially available pyruvaldehyde. This product was supplied as an approximately 30% aqueous solution but it was noted that it contained formaldehyde, acidic substances, and other unknown impurities. Procedure B was used. Ninety-nine grams (0.53 mole) of ethyl beta-oxocaprylate was mixed with 195 ml. of an ice-cold solution containing 39 g. of potassium hydroxide (86% assay) (0.60 mole). After standing for three days in the refrigerator, the excess alkali was approximately neutralized by the slow addition of dilute sulfuric acid (1:4). One hundred and forty grams of commercial pyruvaldehyde (30%) (0.58 mole) was added and the solution adjusted to approximately pH 7.5–8 by the addition of 10% potassium hydroxide solution. The total volume of the reaction mixture was 537 ml. In ninety minutes, the reaction product began to separate as an oil which floated to the surface. After four hours, 104 ml. had separated after which there was no further increase. The next day, the product was isolated in the usual manner by extraction with ether and distillation to yield, after a small forerun, 50.9 g. (52%) B. P. 105–110° at 0.4 mm., $n_D^{25}$ 1.4532. Redistillation gave 41.7 g., B. P. 90–98° at 0.05 mm., $n_D^{25}$ 1.4528.

To illustrate that the reaction can be run under acidic conditions, a solution of sodium beta-oxocaprylate (0.05 mole) was reacted with pyruvaldehyde in the presence of a buffer consisting of a solution of citric acid (0.1 mole) partly neutralized with sodium hydroxide. The initial pH of the reaction mixture was 4.9 and the reaction was allowed to proceed for 24 hours during which time carbon dioxide was evolved and the reaction product separated as an oil, the final pH being 5.1. Extraction and distillation of the product in the usual manner yielded 5.5 g. (59%) of 3-hydroxy-2,5-decanedione.

*3-hydroxy-8-nonene-2,5-dione (Table II compound C).*—In addition to preparing this compound in the usual manner by procedure A from 3-oxo-6-heptenoic acid and pyruvaldehyde (see Table II, compound C) it was also prepared using pyruvaldehyde diethyl acetal as a source of pyruvaldehyde.

Seventeen and a half grams (0.12 mole) of pyruvaldehyde diethyl acetal was refluxed for one hour with 1.6 g. of concentrated sulfuric acid in 60 ml. of water. The solution was cooled in an ice bath and neutralized by the slow addition of about 3 g. of sodium bicarbonate. Procedure C was used. Starting with 17 g. (0.10 mole) of ethyl 3-oxo-6-heptenoate, saponified at 5° for several days with 7.1 g. of potassium hydroxide (87.5% assay) (0.11 mole) in 80 ml. of water, and the hydrolyzed pyruvaldehyde diethyl acetal solution, the reaction time being two days, 10.6 g. (62% yield) of distilled product was obtained, $n_D^{25}$ 1.4660.

Treatment of the hydroxydiketones with acetic anhydride and anhydrous sodium acetate led to the formation of anhydrocompounds of the type illustrated in Formula V. The disemicarbazones of these seem to be identical with the anhydrodisemicarbazones of the corresponding hydroxy-diketones as proved by their analyses and mixed melting points. The analytical data on the anhydrocompounds and their disemicarbazones are presented in Table IV.

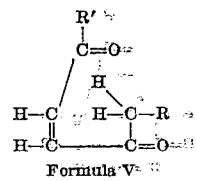

Formula V

The anhydro compounds prepared were 3-decene-2,5-dione; 3,8-decadiene-2,5-dione; 3,8-nonadiene-2,5-dione; 3,9-decadiene-2,5-dione; from the corresponding hydroxydiketones.

The procedure for cyclizing the hydroxydiketones to cyclopentenolones is as follows: The hydroxydiketone was placed in a glass-stoppered Erlenmeyer flask or bottle and 10 to 20 volumes of 1 to 10% sodium hydroxide solution was added. Although other alkaline cyclizing agents such as potassium hydroxide, barium hydroxide, quaternary ammonium hydroxides, and piperidine can be used, sodium hydroxide was found to give uniformly good yields and was generally employed. The air was displaced with nitrogen and the slightly lubricated stopper inserted. If further precautions against oxidation are desired, boiled water may be used in making up the alkali solution, and a small amount of hydroquinone may be added to the reaction mixture. It was then shaken for one to four hours on a shaking machine, occasionally somewhat longer. The reaction mixture turns yellow as soon as the alkali is added and usually becomes darker as the reaction proceeds. After extraction with peroxide-free ether (in the case of the lower molecular weight cyclopentenolones, after saturation with salt), the extract was washed several times with saturated salt solution and after drying over sodium sulfate, the solvent was removed and the residue distilled in high vacuum. Sometimes there was a small forerun (probably uncyclized hydroxydiketone). In each case, as in the distillation of the hydroxydiketones, there was a fraction, not further investigated, boiling considerably higher than the desired compound.

Table V presents the cyclopentenolones of Formula II which were prepared. The compound 3-hydroxy-2,5-hexanedione, Henze's ketol, (Table II, compound H) could not be cyclized by alkali; it yielded, instead, a complex mixture of products. The analytical data on the cyclopentenolones and their semicarbazones are presented in Table VI. The cyclopentenolones are the dl or racemic compounds which may be resolved by conventional means to yield the optically active d and l forms.

TABLE I

*Beta-keto esters*

| | Boiling point, °C. | Pressure, mm. | Refractive index, $n_D$ |
|---|---|---|---|
| A. Ethyl beta-oxocaprylate | 108–112 | 11 | 1.4326 (25°) |
| B. Ethyl 3-oxo-6-octenoate | 110–120 | 10 | 1.4460 (25°) |
| C. Ethyl 3-oxo-6-heptenoate | 107–111 | 14 | 1.4393 (25°) |
| D. Ethyl 6-methyl-3-oxo-6-heptenoate | 119–125 | 16 | 1.4468 (27°) |
| E. Methyl 3-oxo-7-octenoate | 114–122 | 16 | 1.4500 (25°) |
| F. Ethyl 7-methyl-3-oxo-6-octenoate | 135–136 | 15 | 1.4519 (25°) |

TABLE II

*Hydroxydiketones of the type illustrated in Formula I*

| | Product, Formula I | | Pro-cedure | Starting ester [a] | | Pyruvaldehyde | | Reaction volume, ml. | Time, hours | Distilled product | | | | $n_D^{25}$ |
|---|---|---|---|---|---|---|---|---|---|---|---|---|---|---|
| | | | | | | | | | | Yield | | Boiling point | | |
| | R | R' | | Grams | Table I | Grams | Percent assay | | | Grams | Percent of theory | °C. | mm. | |
| A | —n-C$_4$H$_9$ | —CH$_3$ | A | 30 | A | 18 | 87.6 | 200 | 48 | 23 | 65 | 89- 95 | 0.05 | 1.4514 |
| B | —CH$_2$CH=CHCH$_3$ | —CH$_3$ | A | 50.4 | A | 29.5 | 90 | 290 | 72 | 44.7 | 75 | 97-100 | 0.1 | 1.4679 |
| C | —CH$_2$CH=CH$_2$ | —CH$_3$ | A | 50 | B | 32.2 | 90 | 270 | 72 | 35 | 58 | 85- 90 | 0.07 | 1.4657 |
| D | —CH$_2$C(CH$_3$)=CH$_2$ | —CH$_3$ | C | 44 | D | 24 | 76 | 254 | 24 | 25.7 | 58 | 98-102 | 0.3 | 1.4687 |
| E | —CH$_2$CH$_2$CH=CH$_2$ | —CH$_3$ | C | 50 | E | 32.2 | 72.4 | 255 | 16 | 38.4 | 77 | 94- 97 | 0.2 | 1.4675 |
| F | —CH$_2$CH=C(CH$_3$)$_2$ | —CH$_3$ | C | 47.5 | F | 25 | 76 | 300 | 24 | 32.2 | 68 | 106-109 | 0.5 | 1.4715 |
| G | —CH$_2$CH=CH$_2$ | —C$_6$H$_5$ | B | 28 | C | [b] 22.5 | | 210 | 24 | 23.3 | 68 | [c] 154-157 | 0.8 | |
| H | —H | —CH$_3$ | C | [d] 65 | | 41.4 | 88.6 | | 72 | [e] 24.1 | 37 | 62- 67 | 0.5 | 1.4497 |

[a] See Table I for the esters; where procedure A was used, the weight refers to the beta-keto acid, not the ester.
[b] Phenylglyoxal hydrate.
[c] This compound could be crystallized, M. P. 38.5–39° (ether-petroleum ether).
[d] Ethyl acetate.
[e] Product was extracted with ether in a continuous extractor from the sodium chloride-saturated reaction mixture.

TABLE III

*Hydroxydiketones and their anhydrodisemicarbazones*

| Compound [a] | Formula | Analysis | | | | M. P., °C. cor. | Anhydrodisemicarbazone | | | | |
|---|---|---|---|---|---|---|---|---|---|---|---|
| | | Percent calculated | | Percent found | | | Formula | Analysis | | | |
| | | | | | | | | Percent calculated | | Percent found | |
| | | C | H | C | H | | | C | H | C | H |
| A | C$_{10}$H$_{18}$O$_3$ | 64.48 | 9.74 | 64.10 | 9.56 | [b] 224–225 | C$_{12}$H$_{22}$O$_2$N$_6$ | 51.04 | 7.86 | 50.62 | 7.65 |
| B | C$_{10}$H$_{16}$O$_3$ | 65.19 | 8.76 | 64.75 | 8.79 | [b] 227–228 | C$_{12}$H$_{20}$O$_2$N$_6$ | 51.41 | 7.19 | 51.47 | 7.02 |
| C | C$_9$H$_{14}$O$_3$ | 63.51 | 8.29 | 62.82 | 8.05 | [b] 228–229 | C$_{11}$H$_{18}$O$_2$N$_6$ | 49.61 | 6.81 | 49.65 | 6.85 |
| D | C$_{10}$H$_{16}$O$_3$ | 65.19 | 8.76 | 65.28 | 8.38 | [b] 225–226 | C$_{12}$H$_{20}$O$_2$N$_6$ | 51.41 | 7.19 | 50.76 | 6.80 |
| E | C$_{10}$H$_{16}$O$_3$ | 65.19 | 8.76 | 65.01 | 8.52 | [c] 220–221 / [b] 214–215 | C$_{12}$H$_{20}$O$_2$N$_6$ | 51.41 | 7.19 | 51.70 | 6.98 |
| F | C$_{11}$H$_{18}$O$_3$ | 66.64 | 9.15 | 66.80 | 8.75 | [b] 238–239 | | | | | |
| G | C$_{14}$H$_{16}$O$_3$ | 72.39 | 6.94 | 72.56 | 6.85 | | | | | | |

[a] See Table II for the compounds.
[b] Recrystallized from acetic acid, melts with decomposition.
[c] Recrystallized from 95% ethanol, melts with decomposition.

TABLE IV

*Compounds of Formula V and their disemicarbazones*

| | Compound, Formula V | | M. P., °C. cor. | Formula | Analysis | | | | Disemi-carba-zone, M. P., °C. cor. |
|---|---|---|---|---|---|---|---|---|---|
| | | | | | Percent calculated | | Percent found | | |
| | R | R' | | | C | H | C | H | |
| A | —n-C$_4$H$_9$ | —CH$_3$ | [a] 52–53 | C$_{10}$H$_{16}$O$_2$ | 71.39 | 9.59 | 71.27 | 9.44 | [b, c] 228–229 / [d] 224–225 |
| B | —CH$_2$CH=CHCH$_3$ | —CH$_3$ | [a] 52–53 | C$_{10}$H$_{14}$O$_2$ | 72.26 | 8.49 | 71.74 | 8.35 | |
| C | —CH$_2$CH=CH$_2$ | —CH$_3$ | [e] Oil | | | | | | [b] 231–232 / [d] 228–229 |
| D | —CH$_2$CH$_2$CH=CH$_2$ | —CH$_3$ | do [e] | | | | | | [b] 220–221 / [d] 214–215 |

[a] Recrystallized from petroleum ether.
[b] Recrystallized from 95% ethanol, melts with decomposition.
[c] Anal.: Calculated for C$_{12}$H$_{22}$O$_2$N$_6$: C, 51.04; H, 7.86. Found: C, 51.39; H, 7.94.
[d] Recrystallized from acetic acid, melts with decomposition.
[e] Crystallized in refrigerator, melts on warming.

TABLE V
Cyclopentenolones of Formula II

| Product, Formula II | | Hydroxydiketone used [a] | | Alkali used | | Time, hours | Distilled product | | | | $n_D^{25}$ |
|---|---|---|---|---|---|---|---|---|---|---|---|
| | | | | | | | Yield | | Boiling point | | |
| R | R' | Grams | Table II | Percent | Ml. | | Grams | Percent of theory | °C. | Mm. | |
| A | —n-C₄H₉ | —CH₃ | 14 | A | 2 | 140 | 16 | 8.0 | 63 | 110–113 | 0.07 | [b]1.4920 |
| B | —CH₂CH=CHCH₃ | —CH₃ | [c]25 | B | 1 | 500 | 1.5 | 14.0 | 62 | 110–114 | 0.15 | 1.5143 |
| C | —CH₂CH=CH₂ | —CH₃ | 25 | C | 10 | 200 | 1 | 13.3 | 59 | 100–103 | 0.15 | 1.5141 |
| D | —CH₂C(CH₃)=CH₂ | —CH₃ | 31.6 | D | 2 | 640 | 3 | 18.9 | 66 | 115–120 | 0.3 | [d]1.5113 |
| E | —CH₂CH₂CH=CH₂ | —CH₃ | [c]15 | E | 2 | 225 | 3 | 6.4 | 47 | 109–113 | 0.2 | 1.5089 |
| F | —CH₂CH=C(CH₃)₂ | —CH₃ | 25 | F | 2 | 375 | 4 | 13.0 | 57 | 116–119 | 0.3 | 1.5100 |
| G | —CH₂CH=CH₂ | —C₆H₅ | 15 | G | 2 | 225 | 4 | 7.0 | 51 | 153–156 | 0.6 | [e]1.5975 |

[a] See Table II for the hydroxydiketones used.
[b] Regeneration from the semicarbazone and distillation gave a product, B. P. 111–113° (0.2 mm.), $n_D^{25}$ 1.4945.
[c] The hydroxydiketone dissolved in a little ethanol was slowly dropped into the alkali with stirring in a nitrogen swept flask.
[d] Regeneration from the semicarbazone and distillation gave a product, B. P. 112–114° (0.3 mm.), $n_D^{25}$ 1.5120.
[e] When regenerated from the semicarbazone this compound crystallized, M. P. 97.5–98.5 (benzene-petroleum ether)

TABLE VI
Cyclopentenolones and their semicarbazones

| Compound [a] | Formula | Analysis | | | | Semicarbazone | | Analysis | | | |
|---|---|---|---|---|---|---|---|---|---|---|---|
| | | Percent calculated | | Percent found | | M. P.[b] °C., cor. | Formula | Percent calculated | | Percent found | |
| | | C | H | C | H | | | C | H | C | H |
| A | C₁₀H₁₆O₂ | 71.39 | 9.59 | [c]71.10 | [c]9.64 | 199–200 | C₁₁H₁₉O₂N₃ | 58.64 | 8.50 | 58.79 | 8.29 |
| B | C₁₀H₁₄O₂ | 72.26 | 8.49 | 71.75 | 8.40 | 222–223 | C₁₁H₁₇O₂N₃ | 59.17 | 7.68 | 59.29 | 7.51 |
| C | C₉H₁₂O₂ | 71.02 | 7.95 | 70.23 | 8.07 | 213–214 | C₁₀H₁₅O₂N₃ | 57.40 | 7.23 | 57.90 | 7.22 |
| D | C₁₀H₁₄O₂ | 72.26 | 8.49 | [c]72.48 | [c]8.18 | 213–214 | C₁₁H₁₇O₂N₃ | 59.17 | 7.68 | 59.29 | 7.53 |
| E | C₁₀H₁₄O₂ | 72.26 | 8.49 | 71.88 | 8.35 | 195–196 | C₁₁H₁₇O₂N₃ | 59.17 | 7.68 | 58.78 | 7.60 |
| F | C₁₁H₁₆O₂ | 73.29 | 8.95 | 73.44 | 8.71 | 222–223 | C₁₂H₁₉O₂N₃ | [d]17.70 | | [d]17.84 | |
| G | C₁₄H₁₄O₂ | 78.48 | 6.59 | [c]78.49 | [c]6.56 | [f]212–213 | C₁₅H₁₇O₂N₃ | 66.40 | 6.32 | 66.43 | 6.37 |

[a] See Table V for the compounds.
[b] Recrystallized from methanol-ethyl acetate, melts with decomposition.
[c] Analysis on the compound regenerated from its semicarbazone and distilled.
[d] Percent nitrogen.
[e] Analysis on crystalline compound, see Table V, footnote [e].
[f] Recrystallized from acetic acid, melts with decomposition.

The synthetic 2 - (2 - butenyl)-4-hydroxy-3-methyl - 2 - cyclopenten - 1 - one (Formula II, R=—CH₂CH=CHCH₃, R'=—CH₃) which we have prepared is not identical with natural dl-cinerolone which has been assigned the same structural formula [La Forge and Soloway, J. Am. Chem. Soc. 69, 2932 (1947)]. The two appear to be cis-trans or geometrical isomers. Mixtures of corresponding derivatives show definite melting-point depressions. However, on hydrogenation, both of these cyclopentenolones yield the identical product, dl-dihydrocinerolone.

All of the substituted cyclopentenolones described herein in Table V have been esterified with natural d-trans-chrysanthemum monocarboxylic acid yielding esters analogous to cinerin I. In addition, two of them, Formula II, R'=—CH₃, R=—CH₂CH=CHCH₃ and Formula II, R'=—CH₃, R=—CH₂CH=CH₂, have each been esterified with synthetic dl-cis- and dl-trans - chrysanthemum monocarboxylic acids. These esters were prepared by mixing a benzene solution of the crysanthemum monocarboxylic acid chloride with a benzene solution of the cyclopentenolone containing a slight molecular excess of pyridine. After one day, ether was added and the ether solution was washed successively with water, dilute acid, dilute sodium bicarbonate solution, and then with saturated sodium chloride solution. After drying the ether solution, the solvent was removed in vacuum leaving the ester.

Table VII contains data on the toxicity of some esters of the new cyclopentenolones to houseflies and Tables VIII and IX give data on aerosol formulations containing the d-trans-chrysanthemum monocarboxylic acid ester of 2-allyl-4-hydroxy-3-methyl-2-cyclopenten-1-one (ester A of Tables VIII and IX) and the d-trans-chrysanthemum monocarboxylic acid ester of 4-hydroxy-3 - methyl - 2 - (2 - methylallyl) - 2 - cyclopenten-1-one (ester M of Tables VIII and IX).

In addition to the esters shown in Table VII, 2 - allyl - 4 - hydroxy - 3 - methyl - 2 - cyclopenten-1-one has been esterified in the same way with the following acids (via the acid chlorides):

2-(1-methylvinyl)cyclopropanecarboxylic acid.
2 - methyl - 2 - (1 - methylvinyl)cyclopropanecarboxylic acid.
3 - isobutyl - 2,2-dimethylcyclopropanecarboxylic acid.
2 - methyl - 2 - (3 - methyl - 3 - butenyl)cyclopropanecarboxylic acid.

2,2 - dimethyl - 3 - (1 - methylpropenyl) cyclopropanecarboxylic acid.

dl-Chrysanthemum monocarboxylic acid, synthetic cis-trans mixture.

All of these esters exhibited toxicity and knockdown to houseflies.

The synthetic esters have certain advantages over pyrethrum extract, such as freedom from irritating impurities and freedom from insoluble impurities which cause clogging difficulties in formulations used for aerosol-type insecticides.

The insecticidal esters may be formulated in various ways known to those skilled in the art, for use as dusts, sprays, aerosols, emulsions, kerosene or organic solvent solutions, etc. They may, of course, also be used with synergists, or with other insecticides such as DDT, benzene hexachloride, rotenone, chlordane, etc.

TABLE VII

Toxicity of cyclopentenolone esters to houseflies

| Cyclopentenolone used [a] | Acid used to prepare ester | Concentration of ester,[b] mg./ml. | Knockdown 25 minutes, percent | Percent mortality in 1 day |
|---|---|---|---|---|
| A | Natural d-trans-chrysanthemum monocarboxylic acid. | 32 | 100 | 89 |
| | | 16 | 100 | 66 |
| | | 8 | 100 | 35 |
| | | 4 | 100 | 74 |
| B | do | 2 | 100 | 62 |
| | | 1 | 100 | 37 |
| | | 1 | 100 | 77 |
| C | do | 0.5 | 100 | 58 |
| | | 0.25 | 100 | 44 |
| | | 2 | 100 | 78 |
| D | do | 1 | 100 | 65 |
| | | 0.5 | 100 | 48 |
| | | 4 | 100 | 68 |
| E | do | 2 | 100 | 39 |
| | | 1 | 98 | 16 |
| | | 16 | 100 | 67 |
| F | do | 8 | 100 | 45 |
| | | 4 | 97 | 27 |
| | | 8 | 100 | 77 |
| G | do | 4 | 100 | 40 |
| | | 2 | 98 | 23 |
| | | 8 | 100 | 75 |
| B | dl-Cis-chrysanthemum monocarboxylic acid. | 4 | 100 | 40 |
| | | 2 | 100 | 28 |
| | | 2 | 100 | 80 |
| C | do | 1 | 100 | 47 |
| | | 0.5 | 100 | 34 |
| B | dl-Trans-chrysanthemum monocarboxylic acid. | 8 | 100 | 70 |
| | | 4 | 100 | 54 |
| | | 2 | 100 | 29 |
| | | 2 | 100 | 81 |
| C | do | 1 | 100 | 58 |
| | | 0.5 | 100 | 26 |
| Standard-natural pyrethrins in refined kerosene. | | 3.66 | 100 | 66; 71; 71 |
| | | 1.83 | 100 | 44; 47; 55 |
| | | 0.92 | 100 | 24; 29; 33 |

[a] See Table V for the cyclopentenolones of Formula II used.
[b] The solvent was refined kerosene and tests were made by the turntable method [Campbell and Sullivan, Soap 14 (6): 119 (1938)]

TABLE VIII

Tests of aerosol formulations on houseflies at a dosage of 4.63 g./1000 cu. ft., average of 4 tests

| Sample No. | Material | Concentration, percent | Percent knockdown in minutes | | | Percent kill in 1 day |
|---|---|---|---|---|---|---|
| | | | 5 | 10 | 15 | |
| G-580 | Ester A | 1 | 81 | 95 | 99 | 79 |
| | Methylene chloride | 10 | | | | |
| | Freon-12 | 89 | | | | |
| G-581 | Ester M | 1 | 51 | 80 | 93 | 45 |
| | Methylene chloride | 10 | | | | |
| | Freon-12 | 89 | | | | |
| G-583 | 20% pyrethrum extract | [a] 5 | 65 | 83 | 90 | 49 |
| | Methylene chloride | 6 | | | | |
| | Freon-12 | 89 | | | | |

[a] Pyrethrins 1%.

TABLE IX

Tests of aerosol formulations on houseflies at a dosage of 1.16 g./1000 cu. ft., average of 3 tests

| Sample No. | Material | Concentration, percent | Percent knockdown in minutes | | | Percent kill in 1 day |
|---|---|---|---|---|---|---|
| | | | 5 | 10 | 15 | |
| G-587 | Ester A | 0.4 | 61 | 72 | 85 | 93 |
| | DDT | 3 | | | | |
| | Lubricating oil | 5 | | | | |
| | Cyclohexanone | 5 | | | | |
| | Deobase | 1.6 | | | | |
| | Freon-12 | 85 | | | | |
| G-588 | Ester M | 0.4 | 55 | 73 | 85 | 94 |
| | DDT | 3 | | | | |
| | Lubricating oil | 5 | | | | |
| | Cyclohexanone | 5 | | | | |
| | Deobase | 1.6 | | | | |
| | Freon-12 | 85 | | | | |
| G-586 | Pyrethrins (purified) | 0.4 | 16 | 37 | 52 | 88 |
| | DDT | 3 | | | | |
| | Lubricating oil | 5 | | | | |
| | Cyclohexanone | 5 | | | | |
| | Deobase | 1.6 | | | | |
| | Freon-12 | 85 | | | | |
| G-179 | Pyrethrins [a] | 0.4 | 20 | 44 | 61 | 93 |
| | DDT | 3 | | | | |
| | Lubricating oil | 5 | | | | |
| | Cyclohexanone | 5 | | | | |
| | Freon-12 | 85 | | | | |

[a] 2% of a 20% pyrethrum extract was used.

Although the primary object of this invention is the preparation of esters of synthetic cyclopentenolones having a high order of insecticidal toxicity and knockdown, it is within the scope of this invention to prepare esters of the new cyclopentenolones using acid anhydrides or acid chlorides of other acids such as formic, acetic, propionic, palmitic, stearic or other fatty acids, unsaturated aliphatic acids such as aleic acid, saturated or unsaturated cyclic or polycyclic acids, aromatic acids such as benzoic acid, substituted aromatic acids, heterocyclic acids, or substituted heterocyclic acids. The new cyclopentenolones and their esters are potentially useful as intermediates in the preparation of other compounds and in the preparation of insecticides, perfumes, detergents and wetting agents.

Cross-reference is made to our continuation-in-part application Serial No. 161,481, filed on May 11, 1950, to the cyclopentenolone esters and divisional application Serial No. 168,142, filed on June 14, 1950, directed to the hydroxydiketones.

Having thus described our invention, we claim:

1. A method of preparing a cyclopentenolone of the formula:

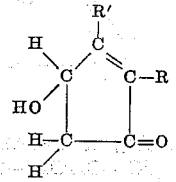

comprising treating a hydroxydiketone of the formula:

$$R'—CO—CHOH—CH_2—CO—CH_2—R$$

with an alkaline cyclizing agent, R' being taken from the group consisting of alkyl, alkenyl and aryl radicals, R being taken from the group consisting of alkyl, alkenyl, substituted alkenyl, aryl, aralkyl, cycloalkyl and cycloalkenyl radicals.

2. The method of claim 1 in which the cyclizing agent is aqueous sodium hydroxide and the reaction is performed without heating.

3. A process of preparing 2-allyl-4-hydroxy-3- methyl-2-cyclopenten-1-one comprising treating the compound of the formula:

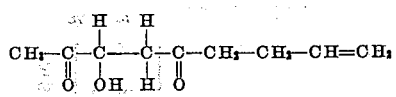

with an alkaline cyclizing agent.

4. A process of preparing 4-hydroxy-3-methyl-2-(2-methylallyl)-2-cyclopenten-1-one comprising treating the compound of the formula:

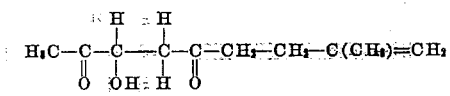

with an alkaline cyclizing agent.

5. A process of preparing 2-(2-butenyl)-4-hydroxy-3-methyl-2-cyclopenten-1-one, corresponding to the formula:

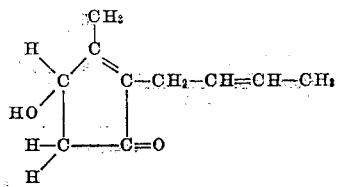

the semicarbazone of which melts with decomposition at about 222-223° C., comprising treating 3-hydroxy-8-decene-2,5-dione with an alkaline cyclizing agent.

6. 2-allyl-4-hydroxy-3-methyl-2-cyclopenten-1-one.

7. 4-hydroxy-3-methyl-2-(2-methylallyl)-2-cyclopenten-1-one.

8. Syntheic racemic 2-(2-butenyl)-4-hydroxy-3-methyl-2-cyclopenten-1-one, the semicarbazone of which has a melting point with decomposition at about 222-223° C.

9. 2-(3-butenyl)-4-hydroxy-3-methyl-2-cyclopenten-1-one.

10. 4-hydroxy-3-methyl-2-(3-methyl-2-butenyl)-2-cyclopenten-1-one.

11. 2-allyl-4-hydroxy-3-phenyl-2-cyclopenten-1-one.

12. A method of preparing a cyclopentenolone of the formula:

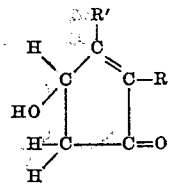

comprising treating a hydroxydiketone of the formula: R'—CO—CHOH—CH₂—CO—CH₂—R with an alkaline cyclizing agent, R' being taken from the group consisting of alkyl, alkenyl and aryl radicals, R being taken from the group consisting of alkyl, alkenyl, substituted alkenyl, aryl, aralkyl, cycloalkyl and cycloalkenyl radicals, the process being carried out in inert atmosphere.

13. The process of claim 12 in which the cyclizing agent is aqueous sodium hydroxide.

14. A process of preparing 2-allyl-4-hydroxy-3-methyl-2-cyclopenten-1-one comprising treating the compound of the formula:

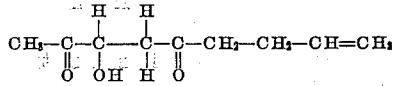

with an alkaline cyclizing agent, the process being carried out in the substantial absence of air, the alkaline cyclizing agent being aqueous sodium hydroxide.

15. A method of preparing a cyclopentenolone of the formula:

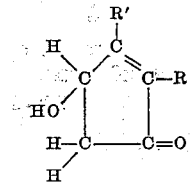

comprising treating a hydroxydiketone of the formula: R'—CO—CHOH—CH₂—CO—CH₂—R with an alkaline cyclizing agent, R' being taken from the group consisting of alkyl, alkenyl and aryl radicals, R being a hydrocarbon radical having at least one olefinic bond.

16. A 4-hydroxy cyclopentenone of the group consisting of 2-allyl-4-hydroxy-3-methyl-2-cyclopenten-1-one; 4-hydroxy-3-methyl-(2-methylallyl)-2-cyclopenten-1-one; synthetic racemic 2-(2-butenyl)-4-hydroxy-3-methyl-2-cyclopenten-1-one, the semicarbazone of which has a melting point with decomposition at about 222-223° C.; 2-(3-butenyl)-4-hydroxy-3-methyl-2-cyclopenten-1-one; 4-hydroxy-3-methyl-2-(3-methyl-2-butenyl)-2-cyclopenten-1-one; and 2-allyl-4-hydroxy-3-phenyl-2-cyclopenten-1-one.

17. A method of preparing a cyclopentenolone of the formula:

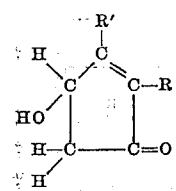

comprising treating a hydroxydiketone of the formula: R'—CO—CHOH—CH₂—CO—CH₂—R with an alakline cyclizing agent, R' being taken from the group consisting of alkyl, alkenyl and aryl radicals, R being a hydrocarbon radical having at least one olefinic bond, the process being carried out in a non-oxidizing atmosphere.

18. The process of claim 12 in which the process is carried out at ordinary room temperature.

19. The process of claim 14 in which the process is carried out at ordinary room temperature.

MILTON S. SCHECHTER.
FREDERICK B. LA FORGE.

References Cited in the file of this patent

UNITED STATES PATENTS

| Number | Name | Date |
|---|---|---|
| 2,096,715 | Haller | Oct. 26, 1937 |
| 2,387,587 | Hunsdiecker | Oct. 23, 1945 |

OTHER REFERENCES

La Forge and Soloway: J. Am. Chem. Soc., vol. 69, page 186 (January 1947). Crombie et al.: Nature, vol. 162, pages 222-223 (1948).